(12) United States Patent
Suzuki et al.

(10) Patent No.: US 9,011,014 B2
(45) Date of Patent: Apr. 21, 2015

(54) ROLLING BEARING

(75) Inventors: Katsuhiro Suzuki, Mie (JP); Eiichirou Shimazu, Mie (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 14/240,402

(22) PCT Filed: Aug. 9, 2012

(86) PCT No.: PCT/JP2012/070347
§ 371 (c)(1),
(2), (4) Date: Feb. 23, 2014

(87) PCT Pub. No.: WO2013/027597
PCT Pub. Date: Feb. 28, 2013

(65) Prior Publication Data
US 2014/0177990 A1 Jun. 26, 2014

(30) Foreign Application Priority Data
Aug. 23, 2011 (JP) ................................. 2011-181713

(51) Int. Cl.
*F16C 33/62* (2006.01)
*F16C 33/76* (2006.01)
(Continued)

(52) U.S. Cl.
CPC ............. *F16C 33/62* (2013.01); *F03D 11/0008* (2013.01); *F05B 2230/90* (2013.01); *F05B 2280/1021* (2013.01); *F05B 2280/1025* (2013.01); *F05B 2280/6011* (2013.01); *F05B 2280/1031* (2013.01); *Y02E 10/722* (2013.01); *Y02E 10/721* (2013.01);
(Continued)

(58) Field of Classification Search
USPC ......... 384/477, 492, 504, 513, 585, 607, 609, 384/625, 913, 569; 205/171, 177, 203; 277/351
See application file for complete search history.

(56) References Cited

U.S. PATENT DOCUMENTS 3,870,607 A * 3/1975 Bardach ......................... 205/122
4,452,539 A * 6/1984 Evans et al. ..................... 384/94
(Continued)

FOREIGN PATENT DOCUMENTS

ES 2073969 A2 * 8/1995 ............... C23F 13/00
JP 60069845 A * 4/1985 ............... G11B 7/24
(Continued)

OTHER PUBLICATIONS

International Search Report PCT/JP2012/070347 Dated Nov. 13, 2012.

*Primary Examiner* — Marcus Charles
(74) *Attorney, Agent, or Firm* — Hedman & Costigan, P.C.; James V. Costigan; Kathleen A. Costigan

(57) ABSTRACT

A rolling bearing which can be large-sized, has corrosion resistance, and is allowed to prevent mounting accuracy from deteriorating, a fixing force from decreasing, vibration from occurring at a portion of the rolling bearing to be fixed to a bearing box or the like, and can be used for a long term even in a highly corrosive environment. A rolling bearing (1) has an inner ring (2), an outer ring (3), and rolling elements (4) as bearing members thereof. Of regions of the bearing members which are exposed to a corrosive environment, a film having a sacrificial anode action for a base material of the bearing members is formed in a region including at least a surface (c, d) of the rolling bearing (1) to be fixed. The film formed on the surface (c, d) thereof to be fixed is porous.

5 Claims, 5 Drawing Sheets

(51) Int. Cl.
*F16C 33/64* (2006.01)
*F03D 11/00* (2006.01)
*F16C 19/08* (2006.01)

(52) U.S. Cl.
CPC ............ *F16C 2223/42* (2013.01); *F16C 19/08* (2013.01); *F16C 33/64* (2013.01); *F16C 33/76* (2013.01)

(56) References Cited

U.S. PATENT DOCUMENTS

| | | | |
|---|---|---|---|
| 4,692,231 A * | 9/1987 | St. Onge | 204/196.15 |
| 4,932,795 A * | 6/1990 | Guinn | 384/276 |
| 5,330,016 A * | 7/1994 | Paske et al. | 175/320 |
| 5,362,921 A * | 11/1994 | Birkelund et al. | 174/47 |
| RE35,860 E * | 7/1998 | Ward | 384/492 |
| 6,206,575 B1 * | 3/2001 | Matsushita et al. | 384/573 |
| 6,471,410 B1 * | 10/2002 | Jacobson et al. | 384/492 |
| 6,994,475 B2 * | 2/2006 | Doll et al. | 384/492 |
| 2002/0191878 A1 * | 12/2002 | Ueda et al. | 384/492 |
| 2005/0078899 A1 * | 4/2005 | Chatry et al. | 384/513 |
| 2008/0187262 A1 * | 8/2008 | Niebling et al. | 384/477 |
| 2010/0135604 A1 * | 6/2010 | Ozaki et al. | 384/448 |
| 2011/0188794 A1 * | 8/2011 | Beresch et al. | 384/548 |

FOREIGN PATENT DOCUMENTS

| | | | | |
|---|---|---|---|---|
| JP | 63024076 A | * | 2/1988 | ............ C23C 26/00 |
| JP | 04027742 A | * | 1/1992 | ............ F02F 1/40 |
| JP | 04-82431 U | | 7/1992 | |
| JP | 06-313435 A | | 11/1994 | |
| JP | 07-301241 A | | 11/1995 | |
| JP | 2526195 Y2 | | 2/1997 | |
| JP | 2008-069925 A | | 3/2008 | |
| JP | 2008-169959 A | | 7/2008 | |
| JP | 2011-007247 A | | 1/2011 | |

* cited by examiner

ROLLING BEARING

CROSS REFERENCE TO RELATED APPLICATIONS

This application is a Section 371 application that claims the priority of PCT/JP2012/070347, filed Aug. 9, 2012 which claims the priority of JP2011-181713, filed Aug. 23, 2011.

TECHNICAL FIELD

The present invention relates to a corrosion-resistant rolling bearing which can be used for a long term without corroding in equipment which is used in a highly corrosive environment such as outside, on the coast, on the sea, and more particularly to a large-sized rolling bearing utilizable for a wind power generator and excellent in its corrosion resistance.

BACKGROUND ART

As a rolling bearing to be used in a highly corrosive environment, there are proposed a rolling bearing in which very expensive ceramics or stainless steel is utilized for an inner ring, an outer ring, and rolling elements and in addition a rolling bearing in which an antirust technique of providing an outer part with a specific sealing construction is adopted. For example, a corrosion-resistant rolling bearing in which the inner ring, the outer ring, and the rolling elements are made of ceramics is proposed (see patent document 1). There is also proposed a rolling bearing in which the inner ring and the outer ring are made of stainless steel and the surfaces thereof are subjected to surface treatment such as film treatment performed by Ni plating, Cr plating or phosphate (see patent documents 2 and 3). There is also proposed a bearing, an outer portion of which is provided with a seal consisting of a magnetic fluid which prevents the penetration of a corrosive gas thereinto (see patent document 4).

PRIOR ART DOCUMENT

Patent Document

Patent document 1: Japanese Utility Model Application Laid-Open Publication No. H4-82431
Patent document 2: Japanese Patent Application Laid-Open Publication No. H7-301241
Patent document 3: Japanese Patent Application Laid-Open Publication No. H6-313435
Patent document 4: Registered Japanese Utility Model No. 2526195

Problems to be Solved by the Invention

In the case where the bearing members such as the inner ring, the outer ring, and rolling elements are made of a highly corrosive material, the bearing members made of ceramics is excellent in the corrosion resistance thereof. But because the bearing members are produced by sintering a pressurized powder body formed by hardening powder, it is difficult to apply ceramics to a large-sized bearing in terms of a production method. In film treatment by means of Ni plating, Cr plating or phosphate, it is difficult to apply the film treatment to the large-sized bearing in terms of its dimension and weight because a treatment bath is utilized in the film treatment.

Example of the large-sized (for example, inside diameter of inner ring is not less than 800 mm) rolling bearings required to be corrosion-resistant in a strict environment include those for use in a generator which generate electricity from natural energy such as wind power and geothermal energy and those for use in equipment disposed on the periphery thereof. Many of places where such natural energy can be effectively obtained are highly corrosive. More specifically, bearings such as a yaw bearing and a blade bearing for use in a wind power generator to be installed on the coast and on the sea are listed. It is difficult to apply conventional rust-proofing treatment methods used for a small-sized rolling bearing to the large-sized bearing in terms of its size and weight. Thus rust-proofing treatment is applied to by means of zinc coating (+pore-sealing treatment) to be carried out by using a brush or spray.

The large-sized bearing is frequently fastened to a bearing box with bolts. But because of its large size, it is difficult to secure close contact between the fixed surface of the large-sized bearing and the bearing box to a sufficient extent. Thus it is feared that vibration generated at the fixed portion of the bearing during the operation of the bearing causes stick-slip to occur and the bolts to loosen (decrease of fixing force). In addition it is feared that a strange noise is generated at the fixed surface of the bearing, thus causing a noise source. Because the fixed surface of the bearing forms the interface of the contact between the fixed surface thereof and a different kind of a material, the fixed surface thereof is liable to corrode to a higher extent than other parts thereof. Therefore it is also feared that the corrosion causes the mounting accuracy of the large-sized bearing to deteriorate.

The present invention has been developed to deal with the above-described problems. Therefore it is an object of the present invention to provide a rolling bearing which can be large-sized, is excellent in its corrosion resistance, and is allowed to prevent mounting accuracy from deteriorating, a fixing force from decreasing, vibration from occurring at a portion of the rolling bearing to be fixed to a bearing box or the like, and can be used for a long term even in a highly corrosive environment.

Means for Solving the Problem

The rolling bearing of the present invention has an inner ring, an outer ring, and rolling elements as bearing members thereof, wherein of regions of the bearing members which are exposed to a corrosive environment, a film having a sacrificial anode action for a base material of the bearing members is formed in a region including at least a surface of the rolling bearing to be fixed. The film formed on the surface of the bearing to be fixed.

The base material of the bearing members consists of an iron-based material. The film having the sacrificial anode action consists of a material containing any of elements zinc, aluminum, and magnesium. The film having the sacrificial anode action is a thermal sprayed film formed by using the above-described material as a thermal spraying material.

The rolling bearing is fastened and fixed to the bearing box at an end surface of the inner ring and/or an end surface of the outer ring. The bearing end surface is the surface of the bearing to be fixed to the bearing box.

The rolling bearing has a sealing member sealing opening portions, of the inner ring and the outer ring, which are disposed at both axial ends thereof. A film having the sacrificial anode action is formed on a bearing end surface, of each of the inner ring and the outer ring, which is disposed at a side where a sealing surface of the sealing member is located.

A part or all of pores of the film having the sacrificial anode action are sealed in a region of the film other than a region of the film formed on the surface of the bearing to be fixed. A part or all of the film having the sacrificial anode action are coated with a material not having the sacrificial anode action in the region of the film other than the region of the film formed on the surface of the bearing to be fixed.

An inside diameter of the inner ring is not less than 800 mm. The rolling bearing is used for a generator or power generation equipment which generates electricity from natural energy. The rolling bearing supports a blade of a wind power generator or a yaw thereof.

Effect of the Invention

The rolling bearing of the present invention has the inner ring, the outer ring, and the rolling elements as bearing members thereof, wherein of regions of the bearing members which are exposed to the corrosive environment, the porous film having the sacrificial anode action is formed on the region of the base material including at least the surface of the bearing to be fixed. Owing to the sacrificial anode action of the film formed on the surface of the bearing to be fixed, it is possible to prevent corrosion of the film-formed region of the base material and the region in the neighborhood of the film-formed region thereof. The film formed on the surface of the bearing to be fixed is capable of preventing corrosion-caused deterioration of mounting accuracy, decrease of bearing-fixing force, and generation of vibrations at the surface of the bearing to be fixed. Because the film formed by thermal spraying or the like on the surface of the bearing to be fastened to the bearing box with bolts is the porous film (not subjected to pore-sealing treatment), the bolts provide an equal fastening force in fixing the rolling bearing to the bearing box irrespective of form accuracy. Thus it is possible to prevent the bolts from loosening and the stick-slip of the fastening portion from occurring during the operation of the rolling bearing. Consequently in the case where the rolling bearing of the present invention is utilized as a large-sized rolling bearing in which the inner diameter of the inner ring is not less than 800 mm, the rolling bearing can be fixed to the bearing box with high reliability by fastening the rolling bearing thereto with the bolts without the occurrence of backlash and used for a long term even in the corrosive environment.

The base material of the bearing member consists of the iron-based material. The film having the sacrificial anode action is made of the thermal sprayed film consisting of the material essentially containing any of elements zinc, aluminum, and magnesium as its main component. Thus the material of the film is softer than the base material of the bearing members. Thereby the bolts provide an equal fastening force and thus it is possible to prevent the bolts from loosening and the stick-slip of the fastening portion from occurring during the operation of the rolling bearing.

In the rolling bearing of the present invention having the sealing member, the film having the sacrificial anode action is formed on the bearing end surface, of each of the inner ring and the outer ring, which is disposed at the side where the sealing surface of the sealing member is located. Thus it is possible to prevent the sealing part from being corroded. Thereby it is possible to prevent the sealing performance from deteriorating due to the corrosion of the sealing part, a lubricant such as grease from leaking from the rolling bearing due to the deterioration of the sealing performance, and the life of the rolling bearing from decreasing.

A part or all of pores of the film having the sacrificial anode action are sealed or a part or all of the film having the sacrificial anode action are coated with the material not having the sacrificial anode action in the region of the film other than the region of the film formed on the surface of the bearing to be fixed. Therefore it is possible to provide the surface of the bearing to be fixed with the effect of improving the corrosion resistance and preventing the occurrence of backlash, while it is possible to further improve the durability and corrosion resistance of regions which are highly exposed to a corrosive environment.

The rolling bearing of the present invention can be utilized as a large-sized bearing in a highly humid environment, an environment where condensation is liable to be generated, and a highly corrosive environment such as on the sea and the coast. For example, the rolling bearing can be suitably utilized as a bearing which supports the blade of the wind power generator or the yaw thereof.

MODE FOR CARRYING OUT THE INVENTION

The present invention is intended to provide a large-sized rolling bearing required to be corrosion-resistant. As such a bearing, a bearing for use in a generator which generates electricity from natural energy such as wind power and a geothermal energy and a bearing for use in equipment disposed on the periphery of the generator are exemplified. Many of places where the natural energy can be effectively obtained are corrosive. Because in recent years, places satisfying the installation condition of a windmill for wind power generation have decreased on land, a large-sized windmill for a wind power generator is increasingly installed on the coast and the sea. Power generation equipment such as the wind power generator which generates electricity from the natural energy is frequently operated unattendedly in terms of efficiency and profit or large-sized power generation equipment is frequently installed on the sea and at high places, as described above. Therefore the rolling bearing for use in the power generation equipment is desired to be maintenance-free in a corrosive environment for a long term (for example, about 10 years, preferably about 20 years).

Although the size of the rolling bearing of the present invention is not limited to a specific size, the present invention is intended to provide a large-sized rolling bearing having a size which makes it difficult to subject it to anti-corrosion treatment by utilizing a treating bath. More specifically the present invention provides a rolling bearing in which the inner ring has an inner diameter not less than 500 mm or not less than 800 mm (and not more than 6000 mm). Examples of such a bearing include a main shaft-supporting bearing of a large-sized wind power generator, a blade bearing for use in a blade pitch swivel seat, and a yaw bearing for use in a yaw swivel seat. The blade bearing is mounted on the base of a blade to rotatably support the blade in such a way as to adjust the angle of the blade in dependence on the intensity of wind so that the blade receives the wind efficiently. The yaw bearing pivotally supports the yaw of a nacelle to adjust the orientation of the main shaft in conformity to a wind direction.

Figure 1:
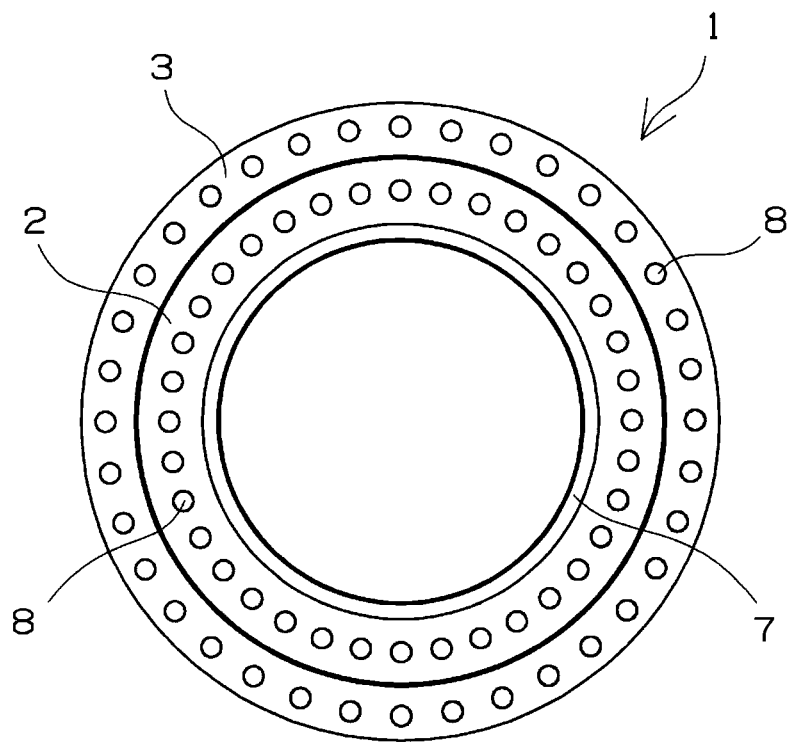
FIG. 1 is front and partial sectional views of a large-sized rolling bearing (provided with internal gear), for use in a wind power generator, which constitutes one embodiment of the present invention.
Figure 1:
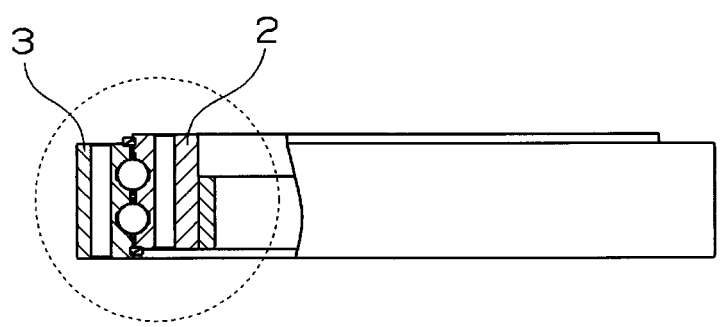
Figure 2:
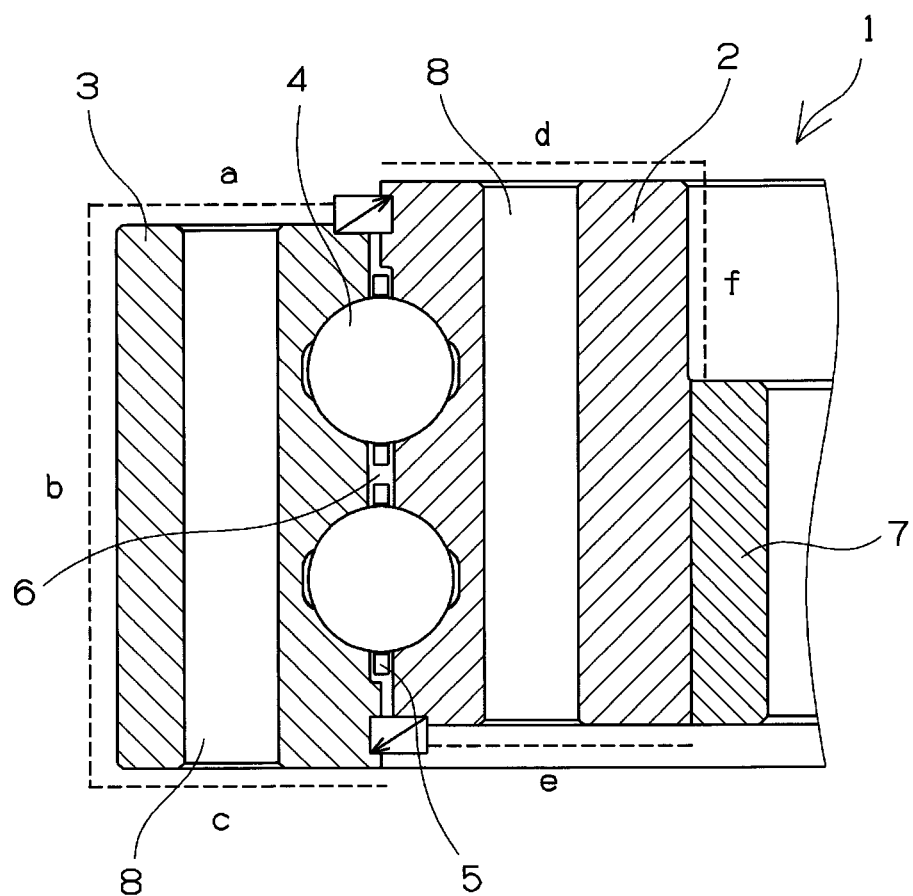
FIG. 2 is a partial sectional view of the large-sized rolling bearing shown in FIG. 1.

One embodiment of the rolling bearing of the present invention is described below with reference to FIGS. 1 and 2. FIG. 1 shows front and partial sectional views of a large-sized bearing (yaw bearing, blade bearing) of a wind power generator. FIG. 2 shows a partly enlarged sectional view of the large-sized bearing shown in FIG. 1. As shown in FIGS. 1 and 2, a rolling bearing 1 of the present invention has an inner ring 2, an outer ring 3, and a plurality of rolling elements 4 as bearing members thereof. The rolling elements 4 are interposed between the inner ring 2 and the outer ring 3 in a double row or a single row with the rolling elements 4 being retained by a cage 5 or a spacer. Grease is packed as a lubricant in a space 6 of the rolling bearing 1 disposed on the periphery of the rolling elements. The rolling bearing 1 is fastened and fixed to a bearing box at an end surface of the inner ring 2 and/or an end surface of the outer ring 3. In the mode shown in FIGS. 1 and 2, the rolling bearing 1 is fastened to the bearing box (not shown in FIGS. 1 and 2) with bolts through a bolt hole 8 formed through each of the inner ring 2 and the outer ring 3. In this mode, although a gear 7 is mounted on the inner peripheral surface of the inner ring 2, the gear 7 may be mounted on the outer peripheral surface of the outer ring in dependence on a portion where the rolling bearing 1 is disposed.

Regions of the bearing members which are exposed to a corrosive environment include surfaces of the inner ring 2 and the outer ring 3 except the inner peripheral surface of the outer ring 3, the outer peripheral surface of the inner ring 2, and the surfaces of the rolling elements. In FIG. 2, a bearing end surface c of the outer ring 3 and a bearing end surface d of the inner ring 2 are surfaces of the bearing to be fixed to a bearing box (not shown in the drawings). In the rolling bearing 1, of regions (a through f) of the bearing members which are exposed to the corrosive environment, a film having a sacrificial anode action to be described later is formed on regions including at least the surfaces (c, d) thereof to be fixed to the bearing box. In FIG. 2, the reference symbols a and c denote the bearing end surfaces of the outer ring 3. The reference symbol b denotes the outer peripheral surface of the outer ring 3. The reference symbols d and e denote the bearing end surfaces of the inner ring 2. The reference symbol f denotes the inner peripheral surface (gear portion is excluded) of the inner ring 2. In the mode shown in FIG. 2, the film is formed on all of the surfaces (a through f) of the bearing members except the surface of the gear part, a groove part, holes, screws, a seal sliding surface, the inner peripheral surface of the outer ring 3, the outer peripheral surface of the inner ring 2, and the surfaces of the rolling elements 4. Because the thickness of the film formed on the surfaces of the bearing members is much smaller than the dimension of the bearing, drawing of the film is omitted (the ranges shown with the broken lines are regions where the film is formed herein. Drawing of the film is also omitted in FIGS. 3 and 4).

Owing to the sacrificial anode action of the film formed on the regions which are exposed to the corrosive environment, it is possible to prevent corrosion of the surfaces of the film-formed regions of the base material of the bearing members and the surfaces of the regions in the neighborhood of the film-formed regions of the base material thereof. By forming the film on at least the surfaces (c, d) of the bearing to be fixed, it is possible to prevent mounting accuracy from deteriorating, a bearing-fixing force from decreasing, and vibrations from being generated due to corrosion at the surfaces of the bearing to be fixed thereto due to corrosion.

Figure 2A:
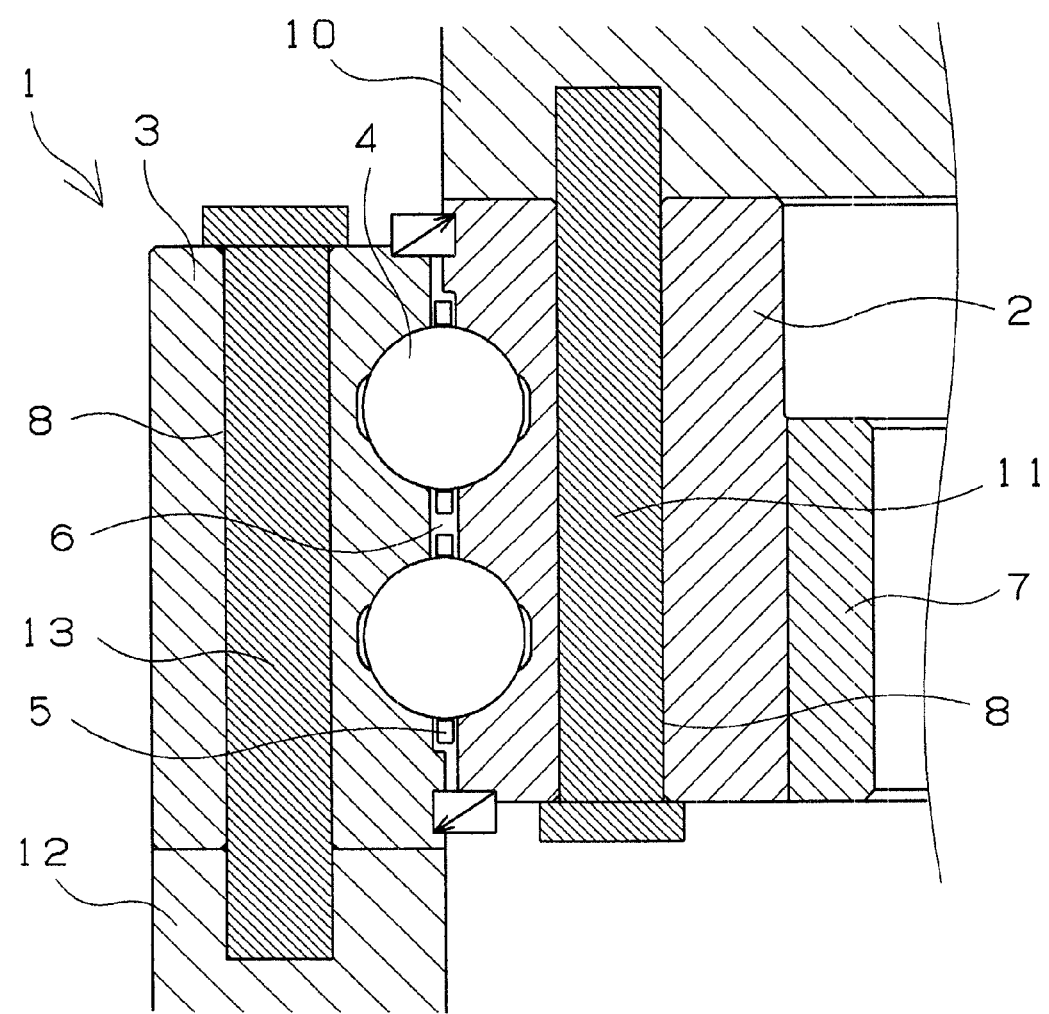
FIG. 2A is a partial sectional view of the bearing shown in FIG. 1 that is fixed to other members.

In fixing the rolling bearing to other members such as the bearing box, the surfaces of the bearing to be fixed thereto contact other members directly or indirectly. FIG. 2A shows the rolling bearing 1 fixed to members 10 and 12 with bolts 11 and 13. The film is partly or entirely on each of the surfaces of the bearing to be fixed thereto.

It is preferable to subject the outer peripheral surface b of the outer ring 3 liable to be exposed to the corrosive environment to sealing treatment or coating treatment to be described later after the film is formed thereon. On the other hand, the film formed by thermal spraying or the like on the surfaces (c, d) of the bearing to be fixed is not subjected to the sealing treatment, but the film is kept porous. As shown in FIG. 1, the rolling bearing is fixed by fastening the rolling bearing thereto with a large number of bolts. By forming the porous film on the surfaces (c, d) of the bearing to be fixed, the bolts provide an equal fastening force in fixing the rolling bearing. Thus it is possible to prevent the bolts from loosening, stick-slip of a fastening portion of the bearing from occurring, and strange noise from being generated due to vibration generated during the operation of the bearing.

Figure 3:
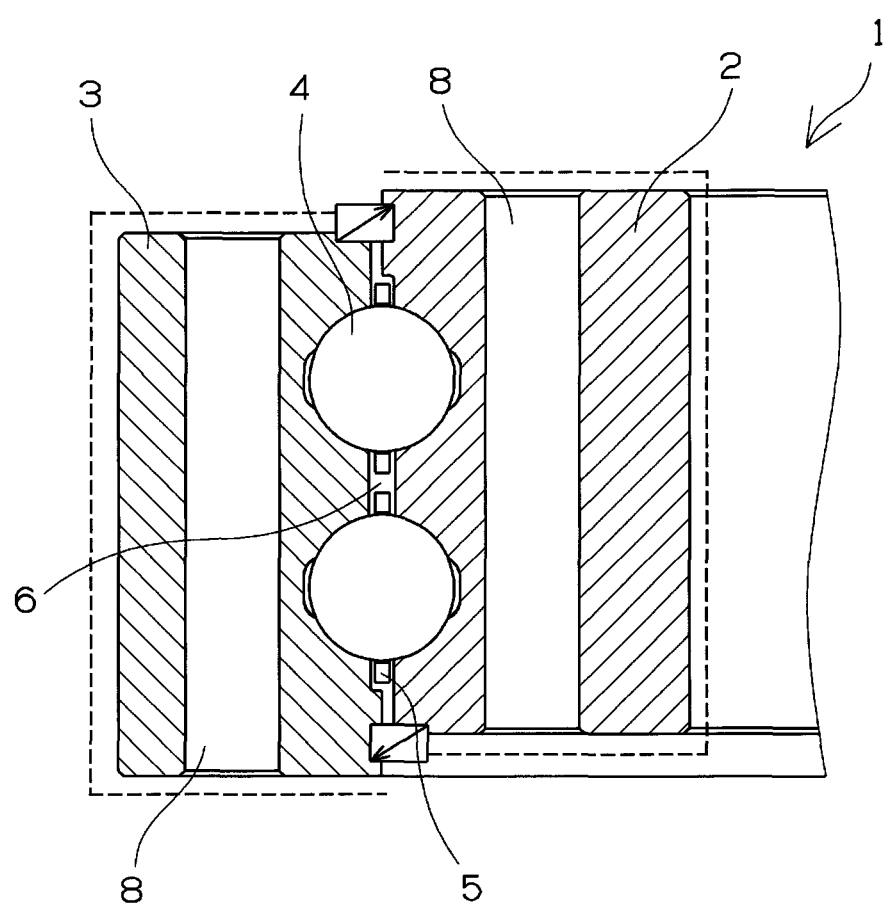
FIG. 3 is a partly enlarged sectional view of a large-sized rolling bearing (not provided with internal gear), for a wind power generator, which constitutes another embodiment of the present invention.

Another embodiment of the rolling bearing of the present invention is described below with reference to FIG. 3. FIG. 3 shows a partly enlarged sectional view of a large-sized bearing (yaw bearing, blade bearing) of the wind power generator. The rolling bearing 1 having a mode shown in FIG. 3 is similar to the mode of the rolling bearing shown in FIGS. 1 and 2 except that the rolling bearing 1 of this embodiment is not provided with the gear 7. Because the gear 7 is not mounted on the inner peripheral surface of the inner ring of the rolling bearing of this embodiment, the film having the sacrificial anode action is formed on the entire inner peripheral surface of the inner ring 2 in addition to the regions of the rolling bearing having the mode shown in FIGS. 1 and 2.

Figure 4:
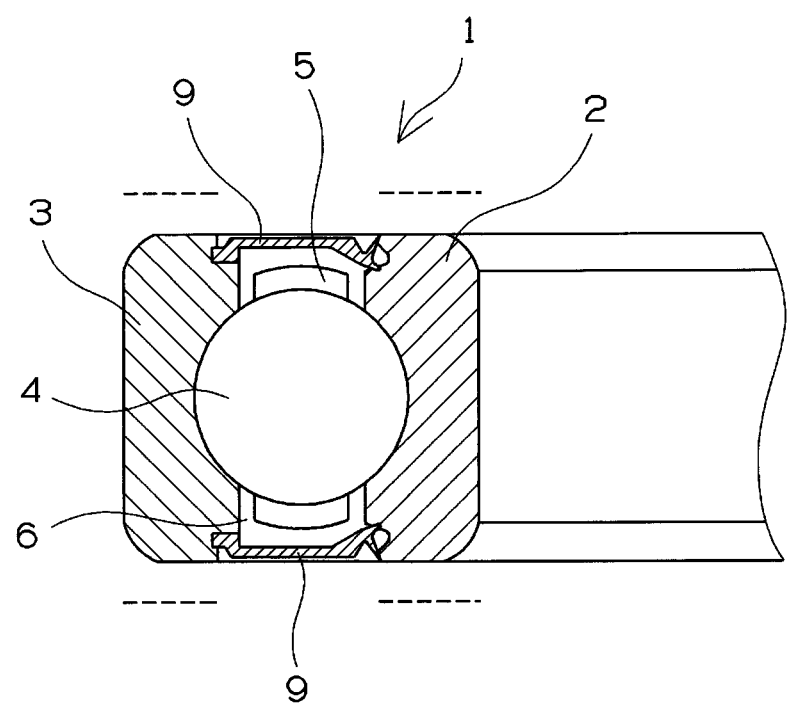
FIG. 4 is a sectional view of a seal-attached deep groove ball bearing constituting still another embodiment of the present invention.

Still another embodiment of the rolling bearing of the present invention is described below with reference to FIG. 4. FIG. 4 shows a sectional view of a seal-attached deep groove ball bearing. The rolling bearing 1 having a mode shown in FIG. 4 has a sealing member 9 which seals opening portions, of the inner ring 2 and the outer ring 3, disposed at both axial ends thereof. A film having the sacrificial anode action is formed on the bearing end surface (both width surfaces of the bearing), of each of the inner ring 2 and the outer ring 3, which is disposed at a side where a sealing surface of the sealing member is located. The rolling bearing 1 is used with the inner peripheral surface of the inner ring and the outer peripheral surface of the outer ring being fitted on other members. A part of each of the bearing end surface is the surface of the bearing to be fixed. Although the film is not formed on the inner peripheral surface of the inner ring and the outer peripheral surface of the outer ring both of which are surfaces to be fitted on other members, the film may be formed on these surfaces to be fitted on the other members as necessary.

Owing to the sacrificial anode action of the film formed on the bearing end surface of the inner ring 2 and that of the outer ring 3, it is possible to prevent a sealing part including the sealing member 9 from being corroded. Thereby it is possible to prevent the sealing performance from being deteriorating due to the corrosion of the sealing part, a lubricant such as grease from leaking from the bearing due to the deterioration of the sealing performance, and the life of the rolling bearing from decreasing.

In addition to the above-exemplified bearings, the rolling bearing of the present invention can be used as a self-aligning roller bearing, an angular ball bearing, a cylindrical roller bearing, a tapered roller bearing, a needle roller bearing, a thrust cylindrical roller bearing, a thrust tapered roller bearing, a thrust needle roller bearing, and a thrust self-aligning roller bearing.

Examples of the base material of the bearing members include iron-based materials such as high carbon chromium bearing steel, cemented steel (case hardening steel), stainless steel, high-speed steel, and cold rolled steel, and hot rolled steel. It is possible to use the above-described steel materials subjected to high frequency heat treatment and nitriding treatment. Of these steel materials, the cemented steel is preferable as the base material of the bearing members (of large-sized rolling bearing in particular) of the present invention, because when it is carburized and quenched, it is hardened in a proper depth from its surface and forms a core having a comparatively low degree of hardness. Thereby the cemented steel is allowed to have both hardness and toughness and excellent shock resistance. More specifically, iron-based alloy steels for machine structural use (JIS G4053) such as chromium-molybdenum steel represented by SCM445 and SCM440 and alloy steels for machine structural use (JIS G4051) represented by S48C and S50C are listed.

The film of the present invention having the sacrificial anode action is capable of displaying the sacrificial anode action in relation to the base material of the bearing members. It is necessary for the film to contain a metal whose ionization tendency is higher than that of a metal composing the base material of the bearing members where the film is to be formed. The kind of the material of the bearing members and the film-forming method are not specifically limited. The ionization tendency means the order of a standard oxidation reduction potential between a hydrated metal ion and a metal in a water solution. In the case where the standard oxidation reduction potential is negative, the larger is the absolute value thereof, "the higher is the ionization tendency".

In the case where the above-described iron-based materials are used as the base material of the bearing members, materials containing elements such as zinc, aluminum or magnesium having a higher ionization tendency than iron are used. The method of forming the film includes coating treatment to be made by using zinc rich paint containing zinc and thermal sprayed film treatment of using zinc, aluminum, an alloy or a pseudo alloy consisting of aluminum and zinc, an alloy consisting of aluminum and magnesium or an alloy consisting of aluminum and titanium as a spraying material.

As a thermal spraying method, it is possible to adopt known thermal spraying methods such as flame spraying method, arc spraying method, plasma spraying method, and laser spraying method. Of these thermal spraying methods, it is preferable to use the arc spraying method. In the arc spraying method, arc is generated between two metal wires to fuse the metal wires. While the metal wires are being fed, droplets of fused metal wires refined by spraying a gas to the metal wires are sprayed to the base material of the bearing members to form a film thereon. It is possible to utilize the material containing zinc, aluminum or magnesium as the thermal spraying material. It is possible to easily secure close contact between the base material of the bearing members and the film formed by carrying out the arc spraying method.

Irrespective of thermal spraying methods, a thermal sprayed film is formed as a result of fusion of a large number of particles having different diameters in only the surface layers thereof. Inevitably, openings and gaps are generated at particle boundaries to form a porous film. As the melting point of the thermal spraying material becomes lower, the particles are liable to become smaller. As a result, pores of an obtained film (porous film) are liable to become smaller. Consequently on the surface of the bearing to be fixed, it is difficult to obtain the effect of preventing the fastening portion from loosening and stick-slip from occurring. Considering the above, it is preferable to use aluminum or the alloy consisting of aluminum and magnesium both having a higher melting point than zinc.

The porosity of the thermal sprayed film is set to 3% to 40% and preferably 5% to 20%. The porosity thereof is adjustable according to a thermal spraying condition or the like. When the porosity thereof is less than 3%, it is difficult to obtain the effect of preventing the fastening portion from loosening and the stick-slip from occurring. On the other hand, in the case where the porosity thereof is more than 40%, there is a fear that the corrosion resistance cannot be sufficiently improved. The above-described range of the porosity thereof is suitable for the film formed on the surface of the bearing to be fixed. When the porosity thereof is adjusted in the above-described range, it is possible to deal with regions required to have higher corrosion resistance by the pore-sealing treatment or the like.

There is a case where a coated film formed by the zinc rich paint is porous. Because the coated film formed on the surface of the bearing to be fixed is porous similarly to the thermal sprayed film, it is possible to prevent the vibration-caused loosening of bolts, occurrence of the stick-slip of the fastening portion, and generation of strange noise during the operation of the bearing.

To further improve the durability, corrosion resistance, and environment shielding property of the film formed in a region of the bearing other than the region of the film formed on the surface of the bearing to be fixed, it is preferable to subject the film disposed in the above-described region to treatment of sealing pores present in the film formed in the above-described region or to treatment of coating the surface of the film or to both treatments. The pore-sealing treatment is to seal a part or all of pores of the film having the sacrificial anode action in a region of the film other than the region of the film formed on the surface of the bearing to be fixed. The coating treatment is to coat a part or all of the film having the sacrificial anode action with a material not having the sacrificial anode action in the region of the film other than the region of the film formed on the surface of the bearing to be fixed.

The pore-sealing treating method is not limited to a specific method, but it is possible to adopt any method capable of sealing a part or all of pores of the porous film formed by the thermal spraying treatment or the like. The material quality of a treating agent is not limited to a specific one either. The pore-sealing treating method includes a method of applying an organic pore-sealing agent such as epoxy resin, acrylic resin, urethane resin, phenol resin or fluororesin or an inorganic pore-sealing agent containing silicate, phosphate or alkoxysilane as its main component to the surface of the thermal sprayed film. In the pore-sealing treatment for the thermal sprayed film, the penetration and filling performance of the pore-sealing agent depend on a grain boundary fusing structure forming the thermal sprayed film to be treated. Therefore it is desirable to select the pore-sealing agent optimum for the grain boundary fusing structure of the thermal sprayed film and for properties demanded for the thermal sprayed film after the thermal sprayed film is subjected to the pore-sealing treatment.

A material to be used in the coating treatment is not limited to a specific one, but it is possible to use any material not containing elements showing the sacrificial anodic property as its main component. Urethane paint and fluorine paint known as general-use paint are exemplified.

The smoother the surface of the film of the present invention having the sacrificial anode action is, the less dirt sticks thereto and thus the film is allowed to obtain high durability. Thus the surface roughness thereof is set to favorably not more than 130 μmRz and more favorably not more than 100 μmRz. Because the film having the sacrificial anode action is formed on the surface of the bearing to be fixed to the bearing box, the film is demanded to have uniformity in its thickness. From the above, by setting the mutual error of the film thickness to not more than 100 μm, it is possible to prevent backlash from occurring, the degree of fixation of the bearing from decreasing, and the bearing from slipping from the bearing box due to the occurrence of the stick-slip during the operation of the bearing.

The thickness of the film of the present invention having the sacrificial anode action is not specifically limited, provided that the film secures demanded degree of durability. In the case where the coated film is not formed, the thickness of the film having the sacrificial anode action is set to favorably 10 to 500 μm, more favorably 50 to 500 μm, and most favorably 100 to 200 μm. In the case where the coated film is formed, the thickness of the film having the sacrificial anode action is set to favorably 10 to 500 μm, more favorably 50 to 500 μm, and most favorably 100 to 200 μm. In the case where the rolling bearing is used for a long term not less than 20 years in a very strict environment such as on the sea, as will be shown in the example, it is possible to exemplify a method of thermally spraying aluminum or an Al—Mg alloy consisting of aluminum and 5 vol % of magnesium added thereto to form a film having a thickness of not less than 100 μm, subjecting the obtained film to the pore-sealing treatment, and thereafter subjecting it to the coating treatment of setting the thickness of the coated film to not less than 100 μm.

Grease to be packed in the space of the rolling bearing of the present invention as a lubricant can be used without limitation, provided that the grease is used for a rolling motion. Examples of the base oil composing the grease include mineral oil such as paraffin-based mineral oil and naphthene-based mineral oil; hydrocarbon-based synthetic oil such as polybutene oil, poly-α-olefin oil, alkylbenzene oil, and alkylnaphthalene oil; and non-hydrocarbon-based synthetic oil such as natural fat and oil, polyol ester oil, phosphate ester oil, diester oil, polyglycol oil, silicone oil, polyphenyl ether oil, alkyldiphenyl ether oil, and fluorinated oil. These base oils may be used singly or in combination of not less than two kinds.

The kinematic viscosity (40° C.) of the base oil to be used in the present invention is favorably 30 to 600 mm$^2$/s. The kinematic viscosity of the base oil to be used for the large-sized bearing of the wind power generator is preferably 300 to 600 mm$^2$/s. When a wind power is low, there is a case where the large-sized bearing (for main shaft) of the wind power generator rotates at a very small number of rotations. As a result, the oil film of the rolling contact surface thereof becomes comparatively thin and unstable. Therefore in the case where the kinematic viscosity of the base oil at 40° C. is less than 300 mm$^2$/s, there is a fear that oil shortage is liable to occur. On the other hand, in the case where the kinematic viscosity thereof at 40° C. is more than 600 mm$^2$/s, the performance of supplying the lubricant to the rolling contact surface thereof is inferior. Consequently fretting (fretting corrosion) is liable to occur. Rolling bearings supporting the blade of the wind power generator or the yaw thereof are rotated not continuously, but when the angle of the blade or the nacelle is adjusted in conformity to the wind direction. Thus it is possible to use the base oil having the kinematic viscosity (40° C.) of about 50 mm$^2$/s for use in these rolling bearings.

Examples of thickeners composing grease include metal soap-based thickeners such as aluminum soap, lithium soap, sodium soap, lithium complex soap, calcium complex soap, and aluminum complex soap; urea-based compounds such as diurea compounds and polyurea compounds; and fluororesin powder such as PTFE resin. These thickeners may be used singly or in combination of not less than two kinds.

Known additives can be added to grease as necessary. As the additives, it is possible to list an extreme pressure agent such as organozinc compounds and organomolybdenum compounds; an antioxidant such as amine-based compounds, phenol-based compounds, and sulfur-based compounds; a wear inhibitor such as sulfur-based compounds and phosphorous-based compounds; a rust-proofing agent such as polyhydric alcohol esters; a viscosity index improver such as polymethacrylate and polystyrene; a solid lubricant such as molybdenum disulfide and graphite; and an oily agent such as ester and alcohol.

It is preferable to set the worked penetration (JIS K 2220) of a grease composition to the range of 200 to 350. In the case where the worked penetration thereof is less than 200, the degree of oil separation at low temperatures is low and thus defective lubrication takes place. Thereby fretting (fretting corrosion) is liable to occur in the case of the large-sized bearing of the wind power generator. On the other hand, in the case where the worked penetration thereof is more than 350, grease is soft and consequently liable to flow out of the bearing.

In the case where the seal-attached rolling bearing of the present invention in which grease is packed is used even in a highly corrosive environment, it is possible to prevent the sealing performance thereof from deteriorating due to corrosion of the sealing part. Thus there is little fear that the grease leaks from the rolling bearing, and desired grease can be selected from among the above-described ones according to demanded properties.

EXAMPLES

With reference to FIGS. 1 and 2, examples in each of which a film was formed on the surfaces (a through f) of a bearing are shown in table 1 through 3. Table 1 shows an example of treatment of forming a film on each rolling bearing which can be used in an aerial marine environment such as on the sea for a long term not less than 20 years (BS5493, Code of practice for protective coating of iron and steel structures against corrosions, British Standards Institution, 1977). Table 2 shows an example of treatment of forming a film on each rolling bearing which can be used on the sea for a long term not less than 10 years (BS5493, same as above). Table 3 shows an especially preferable example of treatment of forming a film on each rolling bearing which supports a blade of a wind power generator or its yaw. The rolling bearing shown in table 3 can be used for a long term not less than 20 years when it is used on the sea (BS5493, same as above).

Two kinds of rolling bearings (1: K2N-TD33402PX1S30 φ1716×2080×168 provided with internal gear, 2: K2N-TD39101PX 1S30 φ2000×2400×205 (provided with internal gear) having a configuration shown in FIGS. 1 and 2 were used in the examples. These rolling bearings were subjected to the film treatment shown in each table. The inner diameter of the inner ring of each rolling bearing was not less than 800 mm. The base material of the inner ring and that of the outer ring subjected to the film treatment was SCM445H.

"AlMg5%" shown in each table means an Al—Mg alloy consisting of aluminum and 5 vol % of magnesium added thereto. "ZnAl15%" shown in each table means a Zn—Al alloy consisting of zinc and 15 vol % of aluminum added thereto. These two alloys were used as thermal spraying materials. The thermal spraying materials were subjected to arc spray to form a thermal sprayed film having the thicknesses shown in the tables on various regions of each rolling bearing. The reference symbols a through f shown in the tables correspond to the regions shown by the reference symbols a through f in FIG. 2. In films having a multi-layered structure, the surface of the base material of each bearing member was treated in the order from (1) to (3) shown in the tables. Films formed on the regions c and d were porous and not subjected to the pore-sealing treatment and the coating treatment.

In the "pore-sealing treatment", epoxy resin-based pore-sealing agent was applied to the surface of each thermal sprayed film. "Coating treatment" was carried out by using urethane paint. In the case of films subjected to the pore-sealing treatment, an intermediate layer consisting of epoxy resin was formed by carrying out coating treatment to improve adhesion between each film and the urethane paint. Thereafter the urethane paint was applied to the intermediate layer.

The thickness of "thermal spraying not less than 100 μm" applied to the regions a, b, e, and f in each example was 115 to 199 μm. The thickness of "thermal spraying not less than 100 μm" applied to the regions c and d in each example was 118 to 168 μm. The film thickness of the total of the thickness "thermal spraying+pore-sealing treatment+coating treatment" in the regions a, b, e, and f was 343 to 504 μm.

TABLE 1

| | Film formed by treating surface of base material of bearing member | |
| --- | --- | --- |
| Example | a, b, e, f | c, d |
| 1 | (1) Thermal spraying of Al not less than 100 μm<br>(2) Pore-sealing treatment<br>(3) Coating not less than 100 μm | Thrmal spraying of Al not less than 100 μm<br>(mutual difference not more than 100 μm) |
| 2 | (1) Thermal spraying of AlMg5% not less than 100 μm<br>(2) Pore-sealing treatment<br>(3) Coating not less than 100 μm | Thrmal spraying of AlMg5% not less than 100 μm<br>(mutual difference not more than 100 μm) |
| 3 | (1) Thermal spraying of ZnAl5% not less than 100 μm<br>(2) Pore-sealing treatment<br>(3) Coating not less than 100 μm | Thrmal spraying of ZnAl5% not less than 100 μm<br>(mutual difference not more than 100 μm) |
| 4 | (1) Thermal spraying of Zn not less than 100 μm<br>(2) Pore-sealing treatment<br>(3) Coating not less than 100 μm | Thrmal spraying of Zn not less than 100 μm<br>(mutual difference not more than 100 μm) |

TABLE 2

| | Film formed by treating surface of base material of bearing member | |
| --- | --- | --- |
| Example | a, b, e, f | c, d |
| 5 | (1) Thermal spraying of Al not less than 100 μm<br>(2) Pore-sealing treatment | Thrmal spraying of Al not less than 100 μm<br>(mutual difference not more than 100 μm) |
| 6 | (1) Thermal spraying of Al not less than 100 μm<br>(2) Pore-sealing treatment | Thrmal spraying of Al not less than 100 μm<br>(mutual difference not more than 100 μm) |
| 7 | (1) Thermal spraying of Al not less than 100 μm | Thrmal spraying of Al not less than 100 μm<br>(mutual difference not more than 100 μm) |
| 8 | (1) Zinc rich paint not less than 50 μm<br>(2) Pore-sealing treatment<br>(3) Coating not less than 100 μm | Zinc rich paint not less than 50 μm<br>(mutual difference not more than 100 μm) |

TABLE 3

| | Film formed by treating surface of base material of bearing member | | |
| --- | --- | --- | --- |
| Example | a, b | e, f | c, d |
| 9 | (1) Thermal spraying of Al not less than 100 μm<br>(2) Pore-sealing treatment<br>(3) Coating not less than 100 μm | Thermal spraying of Al not less than 100 μm | Thrmal spraying of Al not less than 100 μm (mutual difference not more than 50 μm) |

The rolling bearings (surfaces of bearing to be fixed to bearing box were c and d) of the examples 1 through 4 were fastened to bearing boxes respectively with bolts. After a lapse of a certain period of time, the decrease rate of a bolt-tightening torque of each example was measured. The result was that in the same condition, the decrease rate was higher in the order of the example 1 (thermal spraying of Al), the example 2 (thermal spraying of AlMg5%), the example 3 (thermal spraying of ZnAl15%), and the example 4 (thermal spraying of Zn). The result indicates that it is preferable to use aluminum or an alloy containing aluminum as the thermal spraying material.

INDUSTRIAL APPLICABILITY

The rolling bearing of the present invention can be large-sized, is excellent in its corrosion resistance, and is allowed to prevent the mounting accuracy from deteriorating, the fixing force from decreasing, and vibration from occurring at the portion of the bearing to be fixed to the bearing box or the like. Therefore the rolling bearing can be suitably utilized as the large-sized bearing in the highly humid environment, the environment where condensation is liable to occur, and the highly corrosive environment such as on the sea and the shore. For example, the rolling bearing can be preferably utilized as a bearing which supports the blade of the wind power generator or the yaw thereof.

EXPLANATION OF REFERENCE NUMERALS AND SYMBOLS

1: rolling bearing
2: inner ring
3: outer ring
4: rolling element
5: cage
6: space inside bearing
7: gear
8: bolt hole
9: sealing member

The invention claimed is:

1. A rolling bearing comprising an inner ring, an outer ring, and rolling elements as bearing members thereof,
   wherein of regions of said bearing members which are exposed to a corrosive environment, a film having a sacrificial anode action for a base material of said bearing members is formed in a region including at least a surface of said rolling bearing to be fixed to another member; and
   said film formed on said surface is porous;
   said base material of said bearing members consists of an iron based material; and
said film having said sacrificial anode action consists of a material containing any of elements zinc, aluminum and magnesium; and
   said film having said sacrificial anode action is a thermal sprayed film formed by using said material as a thermal spraying material.

2. A rolling bearing according to claim 1, which has a sealing member sealing opening portions, of said inner ring and said outer ring, which are disposed at both axial ends thereof; and a film having said sacrificial anode action is formed on a bearing end surface, of each of said inner ring and said outer ring, which is disposed at a side where a sealing surface of said sealing member is located.

3. A rolling bearing according to claim 1, wherein a part or all of pores of said film having said sacrificial anode action are sealed in a region of said film other than a region of said film formed on said surface.

4. A rolling bearing according to claim 1, wherein a part or all of said film having said sacrificial anode action are coated with a material not having said sacrificial anode action in a region of said film other than a region of said film formed on said surface.

5. A rolling bearing according to claim 1, wherein an inside diameter of said inner ring is not less than 800 mm.

* * * * *